US008601300B2

(12) United States Patent
Anderson et al.

(10) Patent No.: US 8,601,300 B2
(45) Date of Patent: *Dec. 3, 2013

(54) SYSTEM AND METHOD FOR MANAGING THERMAL ENERGY GENERATION IN A HETEROGENEOUS MULTI-CORE PROCESSOR

(75) Inventors: Jon J. Anderson, Boulder, CO (US); Sumit Sur, Boulder, CO (US); Jeffrey A. Niemann, Boulder, CO (US); James M. Artmeier, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/248,160

(22) Filed: Sep. 29, 2011

(65) Prior Publication Data

US 2013/0073875 A1    Mar. 21, 2013

Related U.S. Application Data

(60) Provisional application No. 61/537,441, filed on Sep. 21, 2011.

(51) Int. Cl.
  *G06F 1/32* (2006.01)
  *G06F 9/46* (2006.01)

(52) U.S. Cl.
  USPC .......................... 713/320; 718/102; 718/105

(58) Field of Classification Search
  USPC ................... 713/300, 320; 718/100, 102, 105
  See application file for complete search history.

(56) References Cited

U.S. PATENT DOCUMENTS

| 7,617,403 | B2 | 11/2009 | Capps, Jr. et al. |
| 7,702,938 | B2 | 4/2010 | Ha |
| 2004/0215987 | A1 | 10/2004 | Farkas et al. |
| 2006/0095913 | A1* | 5/2006 | Bodas et al. ................... 718/100 |
| 2007/0061021 | A1* | 3/2007 | Cohen et al. .................... 700/30 |
| 2008/0115010 | A1 | 5/2008 | Rothman et al. |
| 2009/0254909 | A1* | 10/2009 | Hanson et al. ................ 718/102 |
| 2010/0037038 | A1 | 2/2010 | Bieswanger et al. |
| 2010/0077236 | A1* | 3/2010 | Trautman et al. ............. 713/300 |
| 2010/0153541 | A1 | 6/2010 | Arimilli et al. |
| 2010/0153954 | A1 | 6/2010 | Morrow et al. |
| 2011/0138395 | A1 | 6/2011 | Wolfe |
| 2011/0213950 | A1 | 9/2011 | Mathieson et al. |
| 2013/0132972 | A1* | 5/2013 | Sur et al. ....................... 718/105 |

OTHER PUBLICATIONS

"Variable SMP—A Multi-Core CPU Architecture for Low Power and High Performance". NVIDIA Corporation. 2011. pp. 1-16.*
International Search Report and Written Opinion—PCT/US2012/053942—ISA/EPO—Dec. 6, 2012.
Kumar R., et al.,"Single-ISA heterogeneous multi-core architectures: the potential for processor power reduction", Microarchitecture, 2003. Micro-36. Proceedings. 36th Annual IEEE/ACM International Symposium on Dec. 3-5, 2003, Piscataway, NJ, USA.IEEE, Dec. 3, 2003, pp. 81-92, XP010674229, DOI: 10.1109/MICRO.2003.1253185 ISBN: 978-0-7695-2043-8.

* cited by examiner

*Primary Examiner* — Thomas J Cleary
(74) *Attorney, Agent, or Firm* — Nicholas A. Cole (57) ABSTRACT

Various embodiments of methods and systems for controlling and/or managing thermal energy generation on a portable computing device that contains a heterogeneous multi-core processor are disclosed. Because individual cores in a heterogeneous processor may exhibit different processing efficiencies at a given temperature, thermal mitigation techniques that compare performance curves of the individual cores at their measured operating temperatures can be leveraged to manage thermal energy generation in the PCD by allocating and/or reallocating workloads among the individual cores based on the performance curve comparison.

40 Claims, 8 Drawing Sheets

SYSTEM AND METHOD FOR MANAGING THERMAL ENERGY GENERATION IN A HETEROGENEOUS MULTI-CORE PROCESSOR

CROSS-REFERENCE TO RELATED APPLICATIONS

Priority under 35 U.S.C. §119(e) is claimed to the U.S. provisional application entitled "SYSTEM AND METHOD FOR MANAGING THERMAL ENERGY GENERATION IN A HETEROGENEOUS MULTI-CORE PROCESSOR," filed on Sep. 21, 2011 and assigned application Ser. No. 61/537,441, the entire contents of which are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. When two or more heat producing components are suitably spaced from one another within a PCD, heat generated from the operation of each component may not negatively impact the operation of the other. Moreover, when a heat producing component within a PCD is physically isolated from other components within the device, the heat generated from the operation of the heat producing component may not negatively impact other surrounding electronics. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there just typically isn't enough space within a PCD for engineers and designers to mitigate thermal degradation or failure through the leveraging of spatial arrangements or placement of passive cooling components.

Currently, when a PCD approaches a critical temperature, the operating system is designed to cool the PCD by either "wilting" or simply shutting down most of the electronic components within the PCD which are generating, or are suspected of generating, the excessive thermal energy. While wilting or shutting down electronics may be an effective measure for avoiding the generation of excessive thermal energy within a PCD, such drastic measures inevitably impact performance of a PCD and, in some cases, may even render a PCD functionally inoperable for a period time.

Clearly, managing thermal energy generation in a PCD by wilting or shutting down electronics is done at the expense of performance. Consequently, many thermal management techniques that are employed within a PCD seek to balance the inevitable tradeoff between mitigating thermal energy generation and impacting the quality of service ("QoS") provided by the PCD. In a PCD that has heterogeneous processing components, efficiently balancing that tradeoff can be complicated because the various processing components within the PCD are not created equal.

Accordingly, what is needed in the art is a method and system for managing thermal energy generation in a PCD through workload allocation and reallocation, i.e. load switching, across heterogeneous processing components based on comparative analysis of processor performance curves.

SUMMARY OF THE DISCLOSURE

Various embodiments of methods and systems for controlling and/or managing thermal energy generation on a portable computing device that contains a heterogeneous multi-core processor are disclosed. Because individual cores in a heterogeneous processor may exhibit different processing efficiencies at a given temperature, thermal mitigation techniques that compare performance curves of the individual cores at their measured operating temperatures can be leveraged to manage thermal energy generation in the PCD by allocating and/or reallocating workloads among the individual cores based on the performance curve comparison.

One such method involves monitoring temperature readings uniquely associated with each of a plurality of individual processing cores in a heterogeneous multi-core processor and simultaneously tracking workloads assigned to each of the plurality of individual processing cores. Based on the measured temperature associated with each given core, the applicable performance curve for the core can be determined Notably, the performance curve in some embodiments may represent the relationship between power consumption and workload processing capability for the given processing core when operating at the measured temperature.

The determined performance curves for each individual processing core can be compared, or overlayed with one another, to define one or more transition points at the respective instantaneous temperatures of each of the cores under comparison. A transition point is the point at which two of the determined performance curves intersect and represents the workload level at which the two processing cores represented by the performance curves will consume an equivalent amount of power. Notably, for some processing cores in a multi-core heterogeneous processor, power consumption is most efficient at workload levels above the transition point with another processing core. Similarly, for other processing cores in a multi-core heterogeneous processor, power consumption is most efficient at workload levels below the transition point with another processing core.

Advantageously, based on one or more of the determined transition points, workloads can be allocated or reallocated to the individual cores best positioned to efficiently process the determined workload level at the given temperature states across the multi-core hardware. In this way, the overall power consumption of the heterogeneous multi-core processor can be managed to operate as efficiently as possible, saving energy and controlling thermal energy generation without over-impacting QoS.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management" and "thermal mitigation measure(s)" are used interchangeably.

One of ordinary skill in the art will recognize that the term "DMIPS" represents the number of Dhrystone iterations required to process a given number of millions of instructions per second. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing thermal energy generation in a PCD that has a heterogeneous processing component(s), without unnecessarily impacting QoS, can be accomplished by leveraging the diverse performance characteristics of the individual processing cores that are available for workload allocation. With regards to the diverse performance characteristics of various processing cores that may be included in a heterogeneous processing component, one of ordinary skill in the art will recognize that performance differences may be attributable to any number of reasons including, but not limited to, differing levels of silicon, design variations, etc.

For instance, consider an exemplary heterogeneous multi-core processor which may include a number of different processing cores ranging in performance capacities from low to high. As would be understood by one of ordinary skill in the art, a low performance to medium performance processing core within the heterogeneous processor will exhibit a lower power leakage rate at a given workload capacity, and consequently a lower rate of thermal energy generation, than a processing core having a relatively high performance capacity. The higher capacity core may be capable of processing a given number of DMIPs in a shorter amount of time than a lower capacity core.

Even so, depending on the thermal conditions under which the cores may be operating, the lower performance core may be more, or less, efficient (in power consumption) at processing the given number of DMIPs than a high performance core. As such, by considering the individual performance curves of the diverse cores within the heterogeneous processor, where the performance curves indicate the power consumed by a given core at a given operating temperature in order to process a given number of DMIPs, a thermal mitigation algorithm can be leveraged to allocate and/or reallocate (i.e., load switch) workloads to a processing core which offers the best efficiency. Similarly, and also based on the individual performance curves of the diverse cores within the heterogeneous processor, a thermal mitigation algorithm can be leveraged to allocate and/or reallocate (i.e., load switch) workloads such that the power density across the entire processing component is optimized even though the processing efficiencies associated with individual cores may not be optimized.

Figure 1:
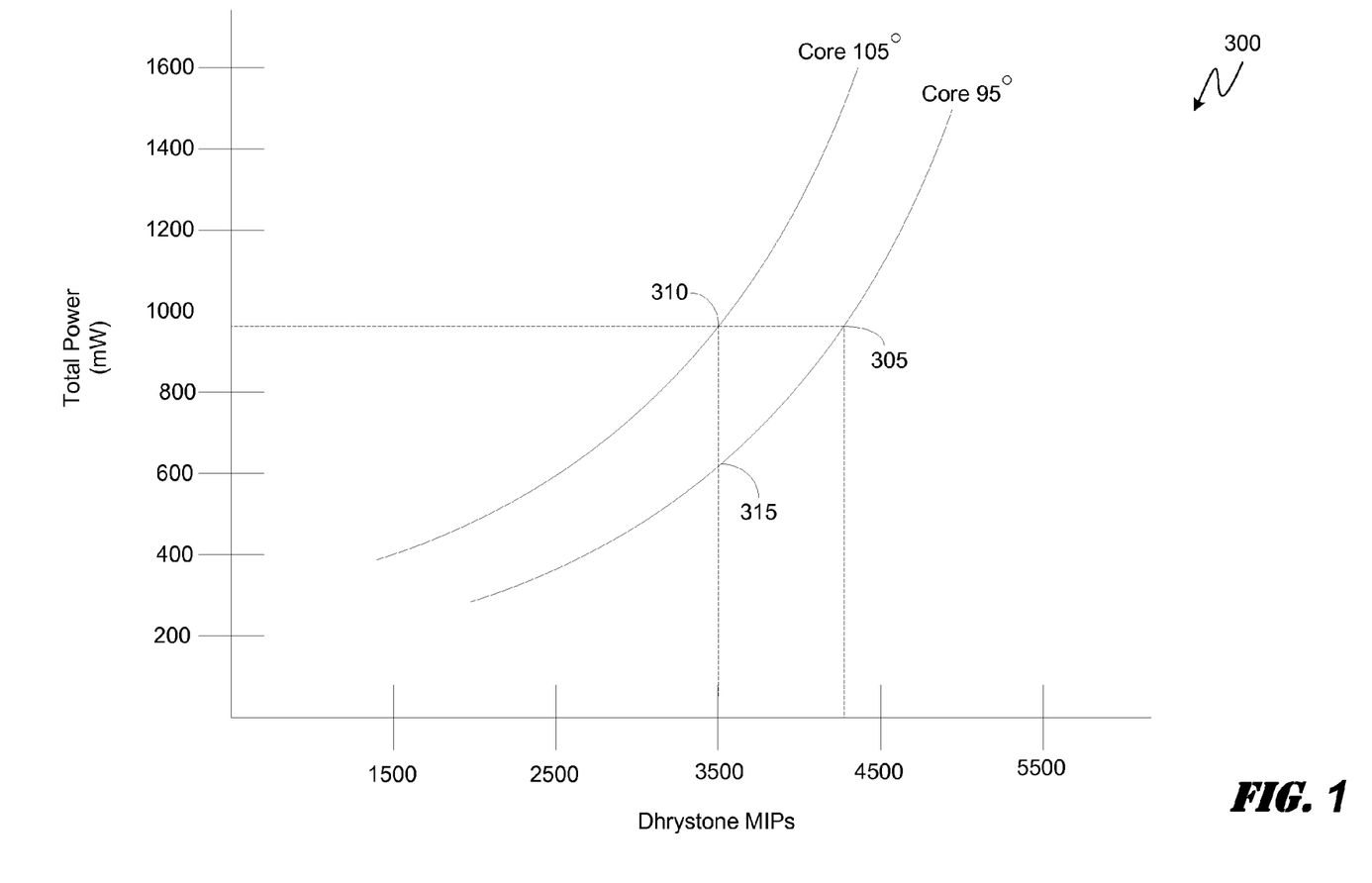
FIG. 1 is a graph illustrating a pair of performance curves of an exemplary processing component operating under different thermal conditions.

FIG. 1 is a graph 300 illustrating a pair of performance curves (Core 105°, Core 95°) of an exemplary processing component operating under different thermal conditions. The processing component may be a core within a heterogeneous multi-core processor and may be a high capacity, medium capacity or low capacity core. As can be seen from the FIG. 1 illustration, at a workload of 3500 DMIPs the exemplary core operating in a 95° environment consumes approximately 620 mW of power (point 315) but, at the same 3500 DMIP workload, the power consumption of the core increases to almost 1000 mW of power (point 310) when the operating environment reaches 105°. Similarly, for a given operating temperature, the processing efficiency of a core decreases with an increase in workload. Referring to the Core 95° curve, for example, when the workload is increased from 3500 DMIPs to approximately 4300 DMIPs, the power consumption increases to almost 1000 mW (point 305).

It can be seen from the FIG. 1 illustration that, for a given processing core, the efficiency of the processing core in terms of power consumption decreases as the operating temperature rises. Notably, one of ordinary skill in the art will recognize that a rise in operating temperature of an exemplary core may be caused by any number of factors or combination of factors including, but not limited to, increased power leakage within the core associated with higher clocking speeds, thermal aggressors adjacent to the core, malfunctioning components adjacent to the core, etc. Regardless of why the operating temperature of a core may rise or fall, it is important to note from the FIG. 1 illustration that, in general, the processing efficiency of a given core decreases inversely with an increase in operating temperature.

Figure 2:
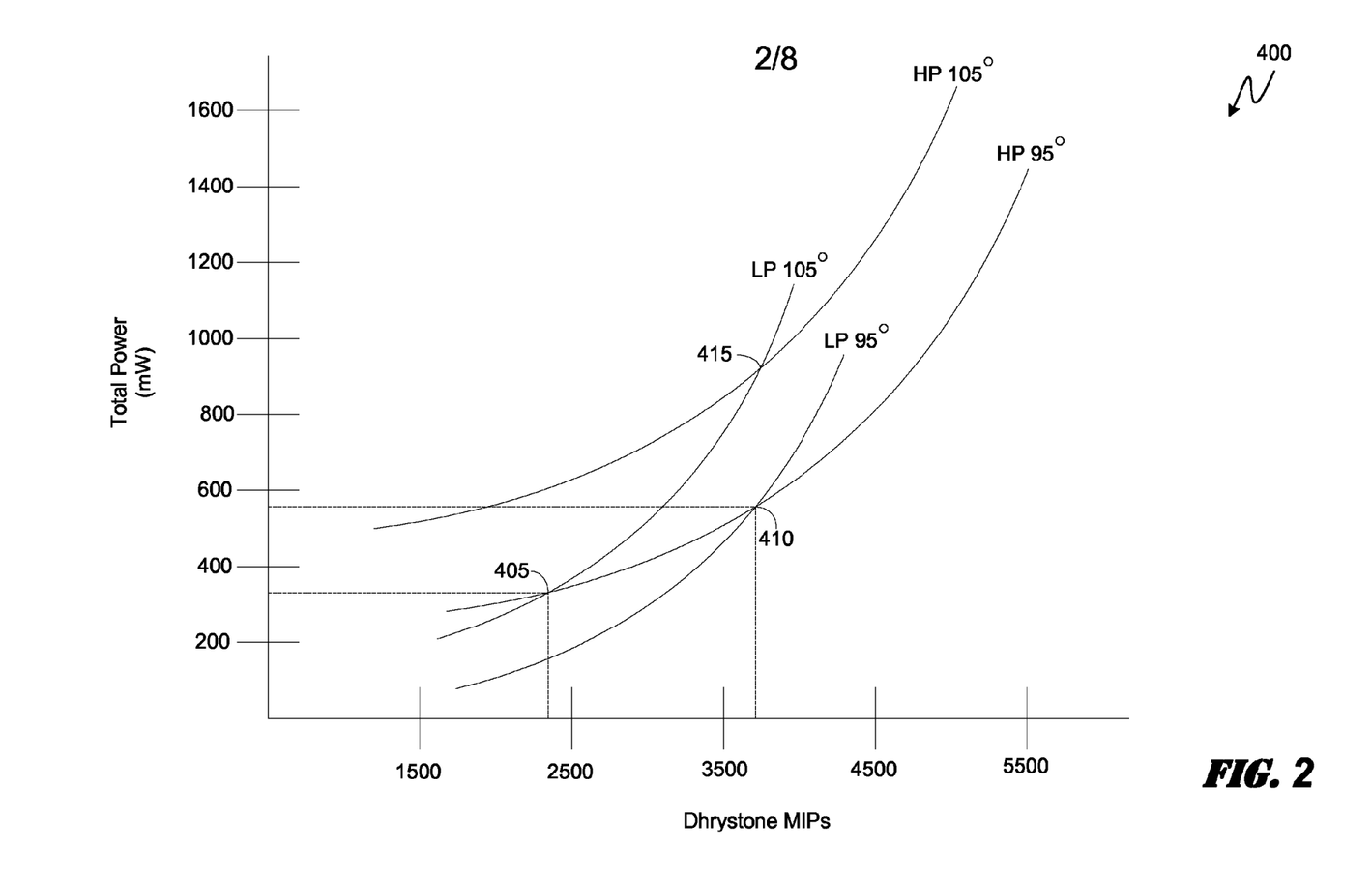
FIG. 2 is a graph illustrating a pair of performance curves for each of two exemplary processing components, a "low performance" processing component and a "high performance" processing component, operating under different thermal conditions.

Turning now to FIG. 2, a graph 400 illustrating a pair of performance curves (HP 105°, HP 95°; LP 105°, LP 95°) for each of two exemplary processing components, a "low performance" processing component and a "high performance" processing component, operating under different thermal conditions is depicted. Essentially, the FIG. 2 graph 400 depicts performance curves for two diverse exemplary cores, each of which may be represented by the FIG. 1 illustration. Moreover, one of ordinary skill in the art will recognize that the two exemplary cores HP, LP represented by the performance curve pairs in FIG. 2 may be contained in a common heterogeneous multi-core CPU.

Notably, by overlaying the performance curves of the exemplary cores HP, LP, it can be seen that various transitions or cross-over points 405, 410, 415 are defined at the intersections of the various curves. These crossover points represent potential triggers that can be leveraged for load switching, or reallocation, in a method and system for managing thermal energy generation in a PCD. Moreover, these crossover points represent potential triggers that can be leveraged for initial load allocation, core initialization, core decommissioning or retirement, core workload affinity definitions, workload biasing, etc. in a method and system for managing thermal energy generation in a PCD.

For instance, a comparative analysis of the exemplary HP, LP processor performance curves, when each of the processors HP, LP are operating at 95°, can determine that both processors HP, LP are substantially equivalent in processing efficiency at a workload of approximately 3700 DMIPs (point 410). It can also be seen from the comparative analysis, however, that the LP core is more efficient below point 410, i.e. the LP core consumes less power per DMIP of workload when the workload is less than 3700 DMIPs. Conversely, the HP core is more efficient above point 410, i.e. the HP core consumes less power per DMIP of workload when the workload exceeds 3700 DMIPs.

Therefore, relying on the exemplary comparative analysis outlined above relative to point 410 of graph 400, a thermal mitigation technique that leverages the comparative analysis of the exemplary LP, HP performance curves at a given operating temperature of 95° may dictate that a workload exceeding 3700 DMIPs should be scheduled to the HP core. Similarly, the same thermal mitigation technique may dictate that a workload less than 3700 DMIPs be scheduled to the LP core. Moreover, because the LP core is more efficient below the transition point 410 than the HP core, a thermal mitigation technique according to an embodiment may reallocate from the LP core to the HP core a partial workload of the LP core that exceeds 3700 DMIPs.

In graph 400, the transition point 415 between the same two exemplary cores LP, HP when the operating temperature is on the order of 105° may trigger events consistent with those exemplary events outlined above relative to point 410. That is, a comparative analysis of the performance curves (HP 105°, LP 105°) may be leveraged by a thermal mitigation technique to schedule or reallocate workloads such that the HP core is biased to process workloads above the transition point 415 and the LP core is biased to process workloads below the transition point 415.

Moreover, it will be understood that, due to any number of factors, diverse cores in a heterogeneous multi-core processor may be operating under different thermal conditions. For example, in the FIG. 2 illustration, a transition point 405 represents the intersection of performance curves for the exemplary LP core operating at 105° and the exemplary HP core operating at 95°. Consequently, if it can be determined that the exemplary cores are operating at differing temperatures, an embodiment may leverage a comparative analysis thermal mitigation technique to determine workload allocation between the two exemplary cores similar to the exemplary scenarios described above. For instance, workloads below 2400 DMIPs may be assigned to the LP core, and workloads above 2400 DMIPs assigned to the HP core, in order to ensure that workloads are processed under the most efficient conditions.

One of ordinary skill in the art will recognize that the various scenarios for load switching, allocation or reallocation outlined above do not represent an exhaustive number of scenarios in which a comparative analysis of processing core performance curves may be beneficial for managing thermal energy generation in a heterogeneous multi-core processor. As such, it will be understood that any thermal mitigation algorithm that is operable to compare the performance curves of two or more processing cores in a heterogeneous multi-core processor to determine a workload allocation or reallocation is envisioned. A comparative analysis of processing core performance curves according to various embodiments can be used to make initial allocations of workloads to one or more of a plurality of processing cores, reallocations of existing workloads between two or more processing cores, or a combination of allocation and reallocation of workloads among a plurality of processing cores.

Figure 3:
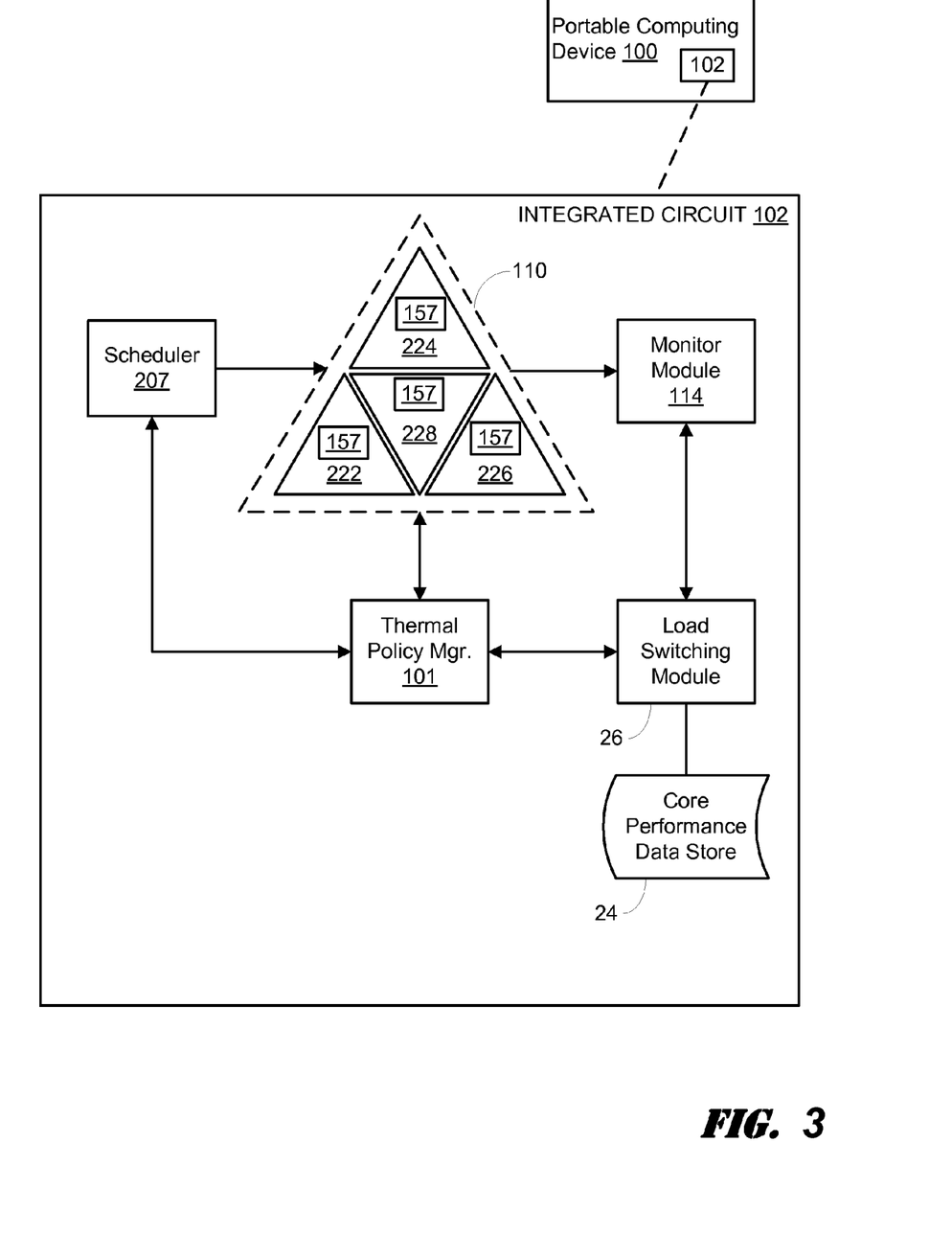
FIG. 3 is a functional block diagram illustrating an embodiment of an on-chip system for managing thermal energy generation in a PCD through workload allocation and reallocation across heterogeneous processing components based on comparative analysis of processor performance curves.

FIG. 3 is a functional block diagram illustrating an embodiment of an on-chip system 102 for managing thermal energy generation in a PCD 100 through workload allocation and/or reallocation across a heterogeneous multi-core processing component(s) 110. As explained above relative to the FIGS. 1 and 2 illustrations, the workload allocation across the cores may be based on a comparative analysis of performance curves uniquely associated with the individual processors 222, 224, 226, 228.

The on-chip system may monitor temperature sensors 157 which are individually associated with cores 222, 224, 226, 228 with a monitor module 114 which is in communication with a load switching ("LS") module 26. Based on the temperature data received from the monitor module 114, the load switching module 26 may reference a core performance ("CP") data store 24 to identify performance curves for one or more of the cores 222, 224, 226, 228. Subsequently, the LS module 26 may overlay the identified performance curves in order to determine various transition points that may represent thresholds for workload allocations, similar to that which is depicted and described in the above Figures.

The LS module 26 may be in communication with a thermal policy manager ("TPM") 101 which is configured to leverage a comparative analysis of one or more performance curves associated with the various, diverse cores 222, 224, 226, 228. The TPM 101 may receive the transition points from the LS module 26 and determine optimal workload ranges for each of the cores. Advantageously, by working with the scheduler 207, the TPM 101 may allocate or reallocate workloads such that the overall power consumed by the heterogeneous multi-core processing component 110 to process the aggregate workload is minimized and thermal energy generation managed. Similarly, one of ordinary skill in the art will recognize that, in other embodiments, the TPM 101 may seek to minimize power consumption on one or more specific cores 222, 224, 226, 228, as opposed to minimizing aggregate power consumption across the heterogeneous multi-core processing component 110.

Figure 4:
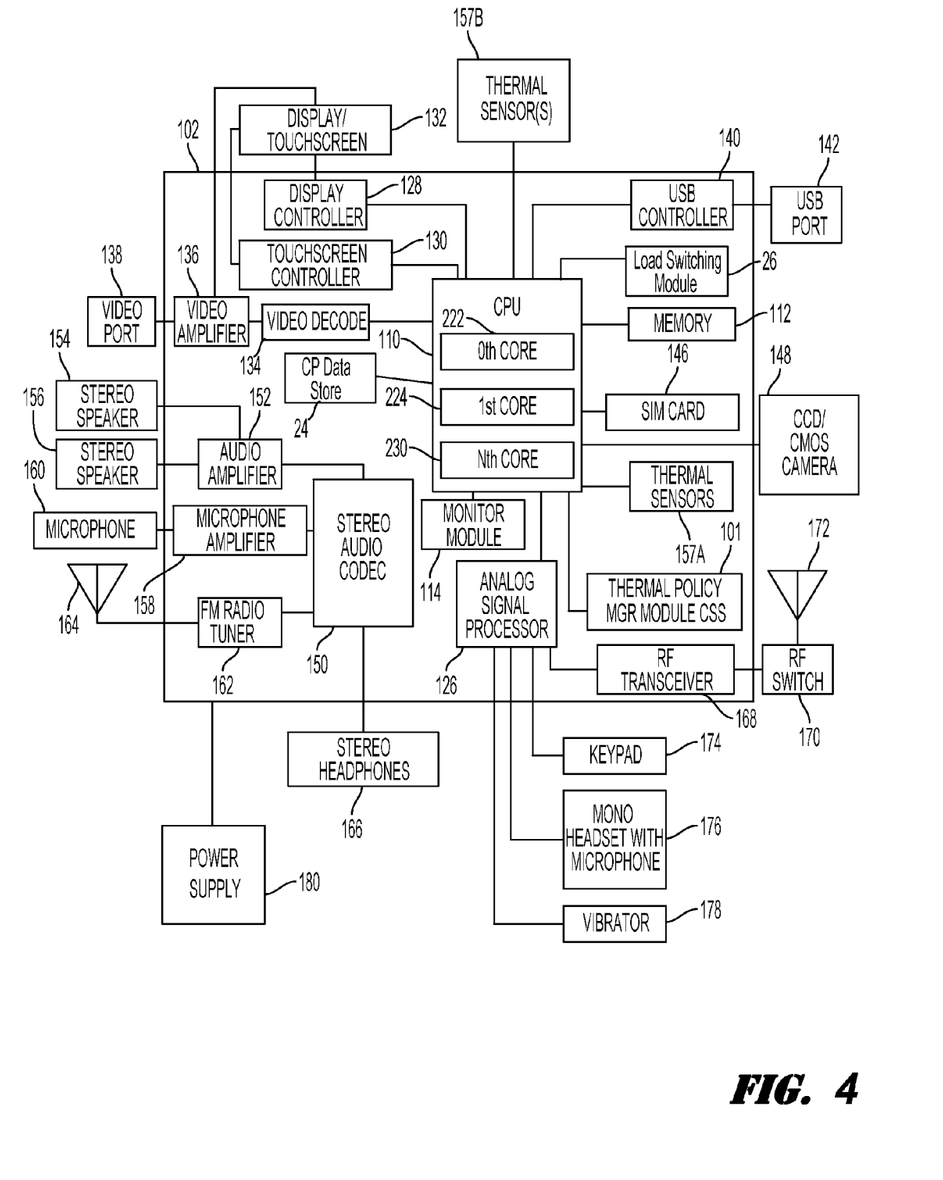
FIG. 4 is a functional block diagram illustrating an exemplary embodiment of the PCD of FIG. 3.

FIG. 4 is a functional block diagram of an exemplary, non-limiting aspect of a PCD 100 in the form of a wireless telephone for implementing methods and systems for monitoring thermal conditions, comparing performance curves and allocating workloads to manage thermal conditions. As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions.

In general, the TPM module(s) 101 may be responsible for monitoring and applying thermal policies that include one or more thermal mitigation techniques that leverage temperature data in conjunction with a comparative analysis of processing core performance curves. Application of the thermal mitigation techniques may help a PCD 100 manage thermal conditions and/or thermal loads and avoid experiencing adverse thermal conditions, such as, for example, reaching critical temperatures, while maintaining a high level of functionality.

FIG. 4 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the TPM module 101 and/or LS module 26. The LS module 26 and TPM module 101 may work with the monitor module 114 to identify thermal transition points that may warrant application of one or more thermal mitigation techniques that include workload allocation and/or reallocation.

As illustrated in FIG. 4, a display controller 128 and a touch screen controller 130 are coupled to the digital signal processor 110. A touch screen display 132 external to the on-chip system 102 is coupled to the display controller 128 and the touch screen controller 130.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 5A). However, other types of thermal sensors 157 may be employed without departing from the scope of the invention.

The thermal sensors 157, in addition to being controlled and monitored by an ADC controller 103, may also be controlled and monitored by one or more TPM module(s) 101. The TPM module(s) 101 may comprise software which is executed by the CPU 110. However, the TPM module(s) 101 may also be formed from hardware and/or firmware without departing from the scope of the invention. The TPM module(s) 101 may be responsible for monitoring and applying thermal policies that include one or more thermal mitigation techniques that may help a PCD 100 avoid critical temperatures while maintaining a high level of functionality.

Similarly, the LS module(s) 26 may comprise software which is executed by the CPU 110. However, the LS module(s) 26 may also be formed from hardware and/or firmware without departing from the scope of the invention.

Returning to FIG. 4, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more TPM module(s) 101 and LS module(s) 26. These instructions that form the TPM module(s) 101 and LS module(s) 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 5A:
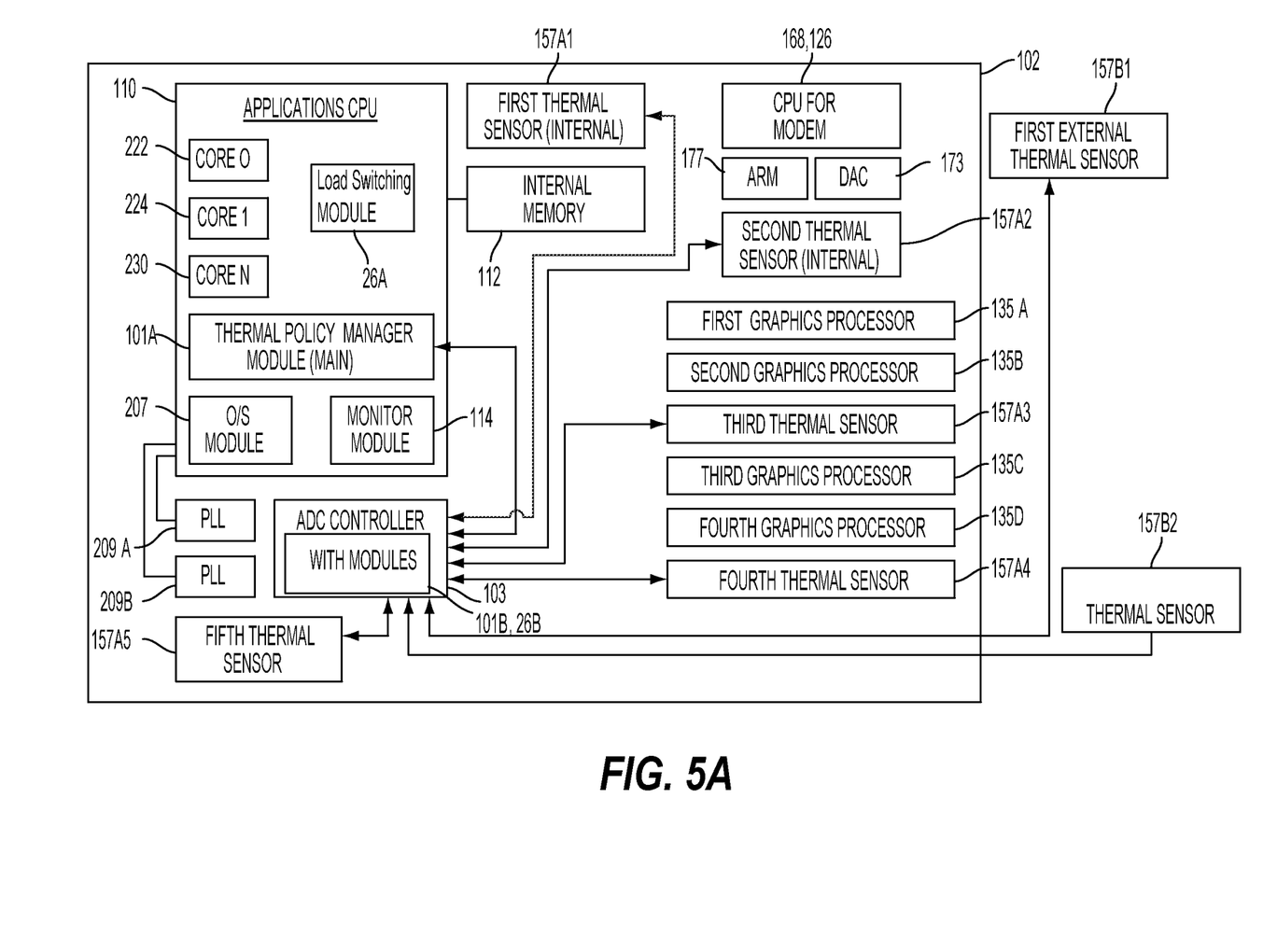
FIG. 5A is a functional block diagram illustrating an exemplary spatial arrangement of hardware for the chip illustrated in FIG. 4.

FIG. 5A is a functional block diagram illustrating an exemplary spatial arrangement of hardware for the chip 102 illustrated in FIG. 4. According to this exemplary embodiment, the applications CPU 110 is positioned on the far left side region of the chip 102 while the modem CPU 168, 126 is positioned on a far right side region of the chip 102. The applications CPU 110 may comprise a heterogeneous multi-core processor that includes a zeroth core 222, a first core 224, and an Nth core 230. The applications CPU 110 may be executing a TPM module 101A and/or LS module 26A (when embodied in software) or it may include a TPM module 101A and/or LS module 26A (when embodied in hardware). The application CPU 110 is further illustrated to include operating system ("O/S") module 207 and a monitor module 114. Further details about the monitor module 114 will be described below in connection with FIG. 5B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B and/or LS module 26B that works in conjunction with the main modules 101A, 26A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations.

As a non-limiting example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 5A may be provided without departing from the scope of the invention. FIG. 5A illustrates yet one exemplary spatial arrangement and how the main TPM and LS modules 101A, 26A and ADC controller 103 with its TPM and LS modules 101B, 26B may recognize thermal conditions that are a function of the exemplary spatial arrangement illustrated in FIG. 5A, compare performance curves and allocate workloads to manage thermal conditions.

Figure 5B:
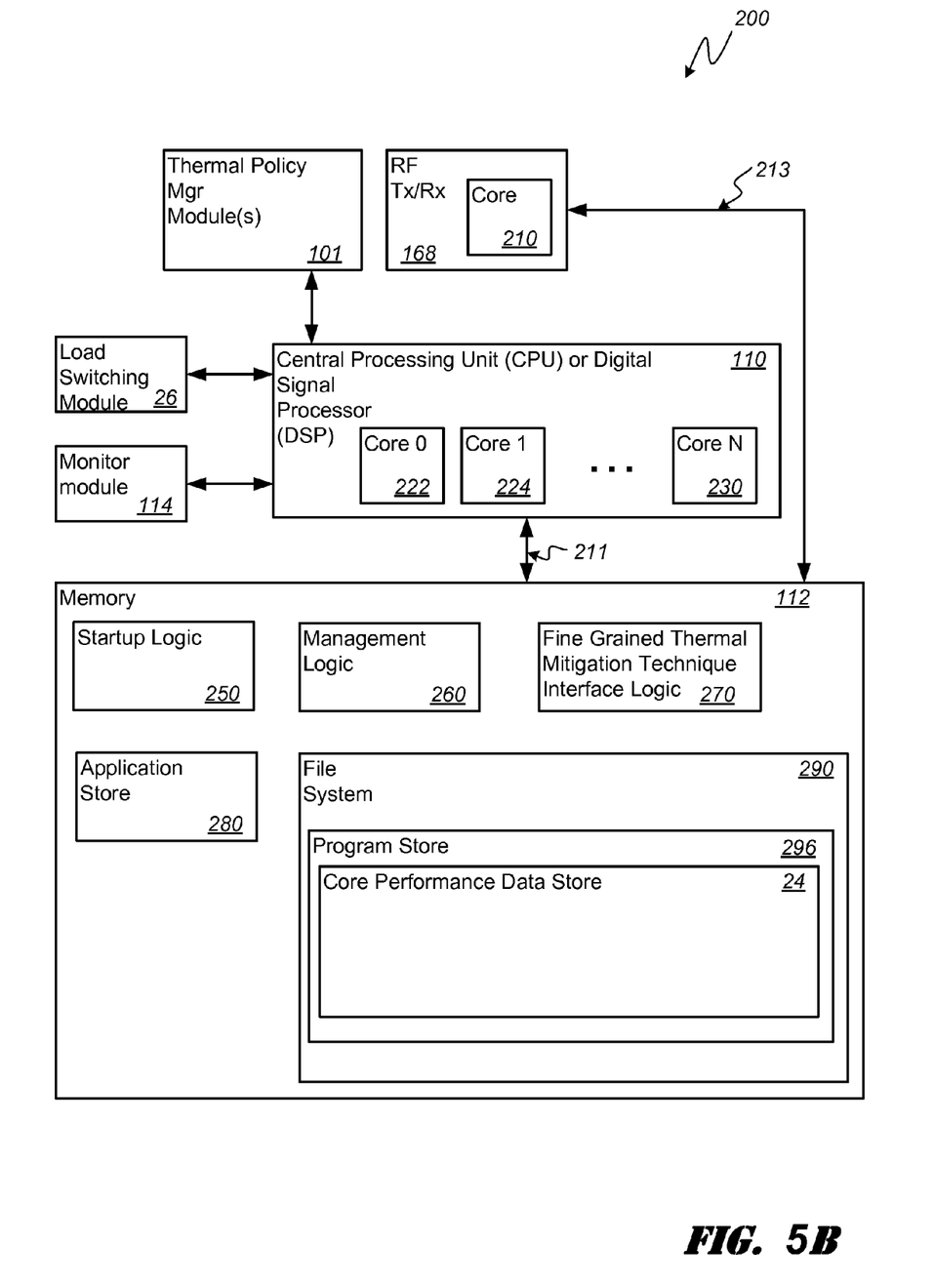
FIG. 5B is a schematic diagram illustrating an exemplary software architecture of the PCD of FIG. 4 for supporting management of thermal energy generation through workload allocation and reallocation across heterogeneous processing components based on comparative analysis of processor performance curves.

FIG. 5B is a schematic diagram illustrating an exemplary software architecture of the PCD 100 of FIG. 4 and FIG. 5A for supporting identification of thermal conditions and application of algorithms associated with thermal mitigation techniques that leverage comparative analysis of processing core performance curves. Any number of algorithms may form or be part of at least one thermal mitigation technique that may be applied by the thermal policy manager 101 when certain thermal conditions are met and performance curves analyzed.

As illustrated in FIG. 5B, the CPU or digital signal processor 110 is coupled to the memory 112 via a bus 211. The CPU 110, as noted above, is a multiple-core, heterogeneous processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous core, may provide differing levels of performance under similar thermal operating conditions. Alternatively, one or more applications or programs can be distributed for processing across two or more of the available heterogeneous cores.

The CPU 110 may receive commands from the TPM module(s) 101 that may comprise software and/or hardware. If embodied as software, the TPM module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 5B, it should be noted that one or more of startup logic 250, management logic 260, thermal mitigation technique interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermal mitigation technique interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

The startup logic 250 includes one or more executable instructions for selectively identifying, loading, and executing a select program for managing or controlling the performance of one or more of the available cores such as the first core 222, the second core 224 through to the $N^{th}$ core 230.

The management logic 260 includes one or more executable instructions for terminating a thermal mitigation program, as well as selectively identifying, loading, and executing a more suitable replacement program for managing or controlling the load allocation to one or more of the available cores. The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor or the core 210 in the RF transceiver 168, may operate in accordance with one or more signals provided by the TPM module 101, LS module 26 and monitor module 114 or one or more signals provided on the respective control inputs of the workload scheduler 207. In this regard, the modules 26, 114 may provide one or more indicators of events, processes, applications, resource status conditions, elapsed time, temperature, etc in response to control signals originating from the TPM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged core performance data store 24. In this regard, the file system 290 may include a reserved section of its total file system capacity for the storage of information associated with the performance curves of the various cores 222, 224, 226, 228 at various operating temperatures.

Figure 6:
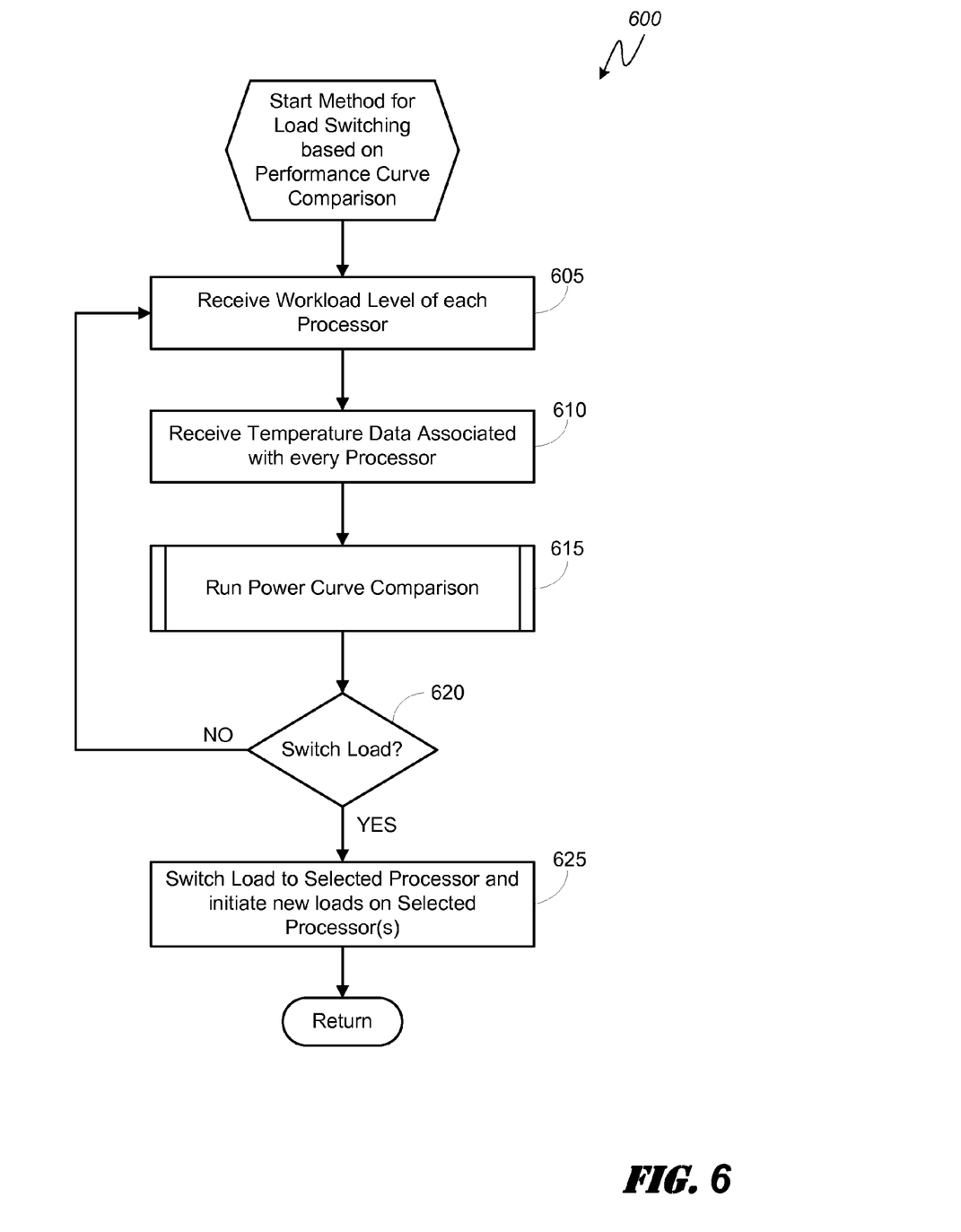
FIG. 6 is a logical flowchart illustrating an embodiment of a method for managing thermal energy generation through workload allocation and reallocation across heterogeneous processing components based on comparative analysis of processor performance curves.

FIG. 6 is a logical flowchart illustrating an embodiment of a method 600 for managing thermal energy generation in a PCD 100 through workload allocation and reallocation across heterogeneous processing components based on comparative analysis of processor performance curves. In the FIG. 6 embodiment, the performance curves for each of the various processing cores 222, 224, 226, 228 may be empirically determined based on actual performance data gathered by the monitoring module 114 or, in some embodiments, the performance curves may be a priori curves driven by the performance specs of each core.

In some embodiments, to empirically determine the performance curves of the various processing cores 222, 224, 226, 228, the monitoring module 114 may be in communication with temperature sensors 157 as well as various other voltage or current sensors useful for monitoring the power consumption of the cores 222, 224, 226, 228. In such an embodiment, one of ordinary skill in the art will recognize that data gather by the monitor module 114 may be coupled with workload allocation data received from the scheduler 207 and compiled by the LS module 26 into empirical performance curves. The empirical performance curves may be stored in the CP data store 24 and leveraged by a load switching thermal mitigation algorithm.

Beginning at blocks 605 and 610, the LS module 26 may receive the current workload level and operating temperature of two or more processing cores 222, 224, 226, 228 in the heterogeneous multi-core processing component 110. The operating temperatures of the various cores 222, 224, 226, 228 can be used to determine the applicable performance curves for each of the cores and, at sub-method 615 the curves can be compared to identify transition points. As described above, based on the transition points and the current workloads for each core being compared, the TPM 101 may determine at decision block 620 whether workloads need to be reallocated. If yes, at block 625 the TPM 101 may reallocate loads among the compared processors and the process returns to blocks 605 and 610. If no, then no workload allocations are made and the process returns to blocks 605 and 610.

Figure 7:
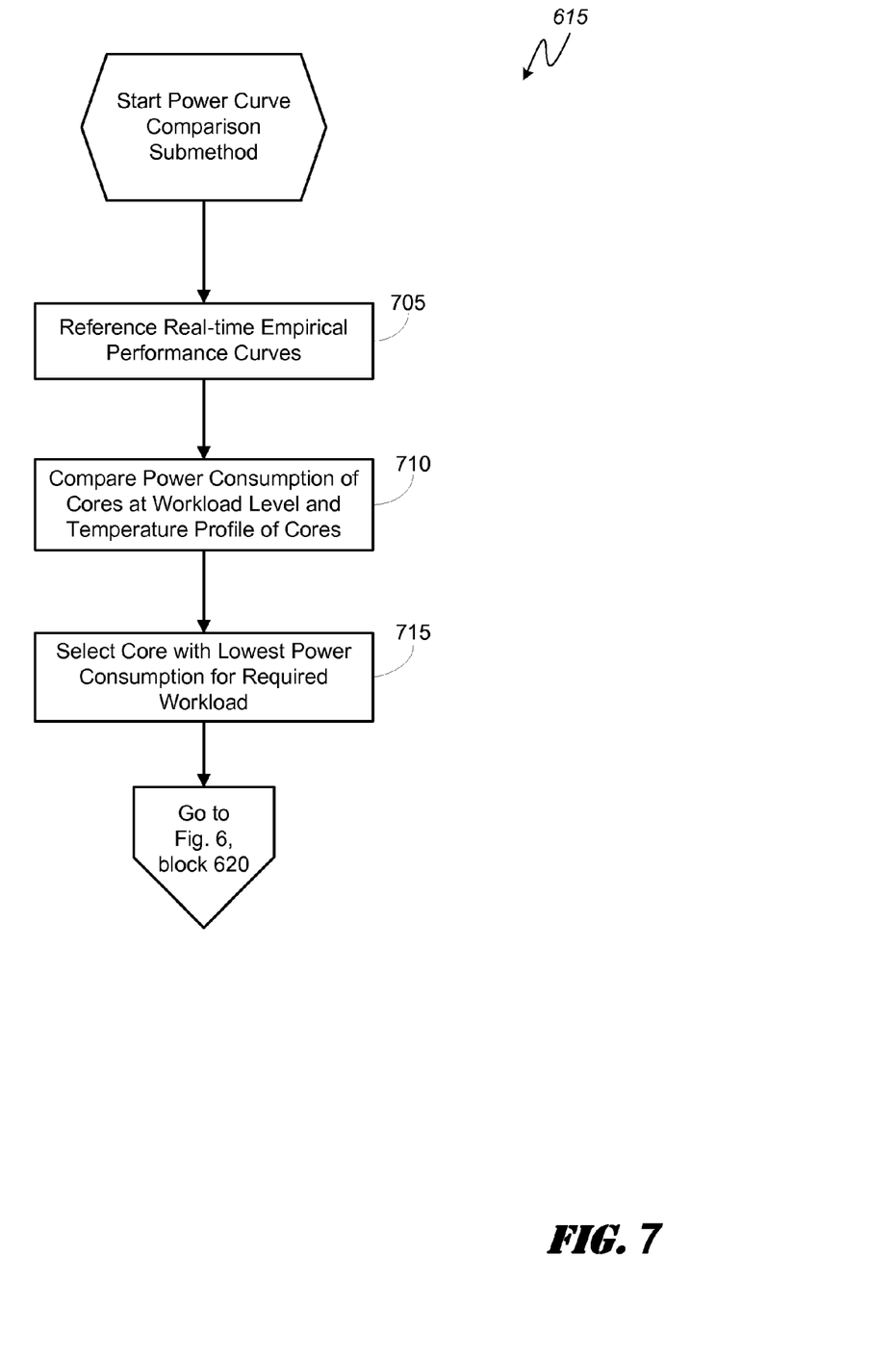
FIG. 7 is a logical flowchart illustrating a sub-method or subroutine for comparative analysis of processor performance curves.

FIG. 7 is a logical flowchart illustrating the sub-method 615 for comparative analysis of processor performance curves. At block 705, the empirically developed curves are referenced based on the temperature measurements associated with each of the cores. Once the appropriate performance curves are identified for each of the processing cores 222, 224, 226, 228 in the heterogeneous multi-core processor 110, at block 710 the curves can be compared to identify transition points. Notably, because the current workload levels for each of the cores can be mapped on the selected curves, the TPM 101 and/or LS module 26 can determine the present power consumption rate for each of the cores. Subsequently, at block 715 a thermal mitigation algorithm can be used to calculate the optimum workload distribution across the cores based on the identified transition points.

As described above relative to the FIG. 1 and FIG. 2 illustrations, for some of the cores the processing efficiency may be better below an identified transition point whereas for other cores the processing efficiency may be better above a transition point. Moreover, as was seen in the FIG. 1 and FIG. 2 illustrations, the performance curve associated with a given core may contain multiple transition points when compared with a plurality of performance curves associated with other cores within the heterogeneous processor. Notably, embodiments of the thermal mitigation algorithm at block 715 may seek to reallocate existing loads and/or allocate additional loads based on the multiple transition points identified in a comparative analysis of a plurality of performance curves. Advantageously, by doing so, some embodiments of a thermal mitigation algorithm may determine allocations and reallocations based on an aggregate power consumption of the various cores 222, 224, 226, 228. Similarly, other embodiments may determine allocations and reallocations of workload based on power consumption levels of individual cores.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing thermal energy generation in a portable computing device having a heterogeneous multi-core processor, the method comprising:
   monitoring temperature readings uniquely associated with each of a plurality of individual processing cores in the heterogeneous multi-core processor;
   tracking workloads assigned to each of the plurality of individual processing cores;
   based on the temperature reading associated with each individual processing core, determining a performance curve for each, wherein the performance curve represents the relationship between power consumption and the number of Dhrystone iterations required to process a given number of millions of instructions per second (DMIPS) for a given individual processing core when operating at a given temperature;
   comparing the determined performance curves for each individual processing core to define one or more transition points, wherein a transition point is the point at which two of the determined performance curves intersect; and
   based on one or more of the determined transition points, allocating or reallocating the workloads to one or more of the plurality of individual processing cores that offers the best efficiency compared to each of the other individual processing cores.

2. The method of claim 1, further comprising:
   determining that the present workload of an individual processing core exceeds a number of Dhrystone iterations required to process a given number of millions of instructions per second (DMIPS) associated with a transition point; and
   reallocating a portion of the present workload to another individual core.

3. The method of claim 1, further comprising:
   determining that the present workload of an individual processing core is less than a number of Dhrystone iterations required to process a given number of millions of instructions per second (DMIPS) associated with a transition point; and
   reallocating a portion of the present workload to another individual core.

4. The method of claim 1, further comprising:
   determining that the present power consumption of an individual processing core exceeds a power consumption level associated with a transition point; and
   reallocating a portion of the present workload to another individual core.

5. The method of claim 1, further comprising:
   determining that the present power consumption of an individual processing core is less than a power consumption level associated with a transition point; and
   reallocating a portion of the present workload to another individual core.

6. The method of claim 1, further comprising:
   calculating the aggregate power consumption across the plurality of individual cores; and
   wherein the workload is allocated such that the aggregate power consumption is minimized.

7. The method of claim 1, wherein the workload is allocated such that the power consumed by an individual core is optimized.

8. The method of claim 1, wherein two or more of the individual processing cores in the heterogeneous multi-core processor are operating at different temperatures.

9. The method of claim 1, wherein one or more of the performance curves are empirically derived.

10. The method of claim 1, wherein the workload is allocated such that the power density across the multi-core heterogeneous processor is optimized.

11. A computer system for managing thermal energy generation in a portable computing device having a heterogeneous multi-core processor, the system comprising:
   a monitor module configured to:
      monitor temperature readings uniquely associated with each of a plurality of individual processing cores in the heterogeneous multi-core processor;
      track workloads assigned to each of the plurality of individual processing cores;
   a load switching module configured to:
      based on the temperature reading associated with each individual processing core, determine a performance curve for each, wherein the performance curve represents the relationship between power consumption and the number of Dhrystone iterations required to process a given number of millions of instructions per second (DMIPS) for a given individual processing core when operating at a given temperature;
      compare the determined performance curves for each individual processing core to define one or more transition points, wherein a transition point is the point at which two of the determined performance curves intersect; and a thermal policy manager module configured to:
based on one or more of the determined transition points, allocate or reallocate the workloads to one or more of the plurality of individual processing cores that offers the best efficiency compared to each of the other individual processing cores.

12. The computer system of claim 11, wherein the thermal policy manager is further configured to:
determine that the present workload of an individual processing core exceeds a number of Dhrystone iterations required to process a given number of millions of instructions per second (DMIPS) associated with a transition point; and
reallocate a portion of the present workload to another individual core.

13. The computer system of claim 11, wherein the thermal policy manager is further configured to:
determine that the present workload of an individual processing core is less than a number of Dhrystone iterations required to process a given number of millions of instructions per second (DMIPS) associated with a transition point; and
reallocate a portion of the present workload to another individual core.

14. The computer system of claim 11, wherein the thermal policy manager is further configured to:
determine that the present power consumption of an individual processing core exceeds a power consumption level associated with a transition point; and
reallocate a portion of the present workload to another individual core.

15. The computer system of claim 11, wherein the thermal policy manager is further configured to:
determine that the present power consumption of an individual processing core is less than a power consumption level associated with a transition point; and
reallocate a portion of the present workload to another individual core.

16. The computer system of claim 11, wherein the thermal policy manager is further configured to:
calculate the aggregate power consumption across the plurality of individual cores; and
allocate the workload such that the aggregate power consumption is minimized.

17. The computer system of claim 11, wherein the thermal policy manager is further configured to allocate the workload such that the power consumed by an individual core is optimized.

18. The computer system of claim 11, wherein two or more of the individual processing cores in the heterogeneous multi-core processor operate at different temperatures.

19. The computer system of claim 11, wherein the load switching module is further configured to empirically derive one or more of the performance curves.

20. The computer system of claim 11, wherein the workload is allocated such that the power density across the multi-core heterogeneous processor is optimized.

21. A computer system for managing thermal energy generation in a portable computing device having a heterogeneous multi-core processor, the system comprising:
means for monitoring temperature readings uniquely associated with each of a plurality of individual processing cores in the heterogeneous multi-core processor;
means for tracking workloads assigned to each of the plurality of individual processing cores;
means for, based on the temperature reading associated with each individual processing core, determining a performance curve for each, wherein the performance curve represents the relationship between power consumption and the number of Dhrystone iterations required to process a given number of millions of instructions per second (DMIPS) for a given individual processing core when operating at a given temperature;
means for comparing the determined performance curves for each individual processing core to define one or more transition points, wherein a transition point is the point at which two of the determined performance curves intersect; and
means for, based on one or more of the determined transition points, allocating or reallocating the workloads to one or more of the plurality of individual processing cores that offers the best efficiency compared to each of the other individual processing cores.

22. The computer system of claim 21, further comprising:
means for determining that the present workload of an individual processing core exceeds a number of Dhrystone iterations required to process a given number of millions of instructions per second (DMIPS) associated with a transition point; and
means for reallocating a portion of the present workload to another individual core.

23. The computer system of claim 21, further comprising:
means for determining that the present workload of an individual processing core is less than a number of Dhrystone iterations required to process a given number of millions of instructions per second (DMIPS) associated with a transition point; and
means for reallocating a portion of the present workload to another individual core.

24. The computer system of claim 21, further comprising:
means for determining that the present power consumption of an individual processing core exceeds a power consumption level associated with a transition point; and
means for reallocating a portion of the present workload to another individual core.

25. The computer system of claim 21, further comprising:
means for determining that the present power consumption of an individual processing core is less than a power consumption level associated with a transition point; and
means for reallocating a portion of the present workload to another individual core.

26. The computer system of claim 21, further comprising:
means for calculating the aggregate power consumption across the plurality of individual cores; and
wherein the workload is allocated such that the aggregate power consumption is minimized.

27. The computer system of claim 21, wherein the workload is allocated such that the power consumed by an individual core is optimized.

28. The computer system of claim 21, wherein two or more of the individual processing cores in the heterogeneous multi-core processor are operating at different temperatures.

29. The computer system of claim 21, wherein one or more of the performance curves are empirically derived.

30. The computer system of claim 21, wherein the workload is allocated such that the power density across the multi-core heterogeneous processor is optimized.

31. A computer program product comprising a non-transitory computer readable medium having a computer readable program code embodied therein, said computer readable program code adapted to be executed to implement a method for managing thermal energy generation in a portable computing device having a heterogeneous multi-core processor, said method comprising:

monitoring temperature readings uniquely associated with each of a plurality of individual processing cores in the heterogeneous multi-core processor;

tracking workloads assigned to each of the plurality of individual processing cores;

based on the temperature reading associated with each individual processing core, determining a performance curve for each, wherein the performance curve represents the relationship between power consumption and the number of Dhrystone iterations required to process a given number of millions of instructions per second (DMIPS) for a given individual processing core when operating at a given temperature;

comparing the determined performance curves for each individual processing core to define one or more transition points, wherein a transition point is the point at which two of the determined performance curves intersect; and     based on one or more of the determined transition points, allocating or reallocating the workloads to one or more of the plurality of individual processing cores that offers the best efficiency compared to each of the other individual processing cores.

32. The computer program product of claim 31, wherein the program code implementing the method further comprises:

determining that the present workload of an individual processing core exceeds a number of Dhrystone iterations required to process a given number of millions of instructions per second (DMIPS) associated with a transition point; and     reallocating a portion of the present workload to another individual core.

33. The computer program product of claim 31, wherein the program code implementing the method further comprises:

determining that the present workload of an individual processing core is less than a number of Dhrystone iterations required to process a given number of millions of instructions per second (DMIPS) associated with a transition point; and     reallocating a portion of the present workload to another individual core.

34. The computer program product of claim 31, wherein the program code implementing the method further comprises:

determining that the present power consumption of an individual processing core exceeds a power consumption level associated with a transition point; and     reallocating a portion of the present workload to another individual core.

35. The computer program product of claim 31, wherein the program code implementing the method further comprises:

determining that the present power consumption of an individual processing core is less than a power consumption level associated with a transition point; and     reallocating a portion of the present workload to another individual core.

36. The computer program product of claim 31, wherein the program code implementing the method further comprises:

calculating the aggregate power consumption across the plurality of individual cores; and     wherein the workload is allocated such that the aggregate power consumption is minimized.

37. The computer program product of claim 31, wherein the workload is allocated such that the power consumed by an individual core is optimized.

38. The computer program product of claim 31, wherein two or more of the individual processing cores in the heterogeneous multi-core processor are operating at different temperatures.

39. The computer program product of claim 31, wherein one or more of the performance curves are empirically derived.

40. The computer program product of claim 31, wherein the workload is allocated such that the power density across the multi-core heterogeneous processor is optimized.

* * * * *